United States Patent

[11] 3,620,756

| [72] | Inventors | Rudolf G. K. Strobel<br>Colerain Township;<br>Neil R. Artman, Wyoming, both of Ohio |
|---|---|---|
| [21] | Appl. No. | 801,246 |
| [22] | Filed | Feb. 17, 1969 |
| [45] | Patented | Nov. 16, 1971 |
| [73] | Assignee | The Procter & Gamble Company<br>Cincinnati, Ohio |

[54] NONFOAMING AND NONSCUMMING INSTANT COFFEE
10 Claims, No Drawings

| [52] | U.S. Cl. | 99/71 |
|---|---|---|
| [51] | Int. Cl. | A23f 1/04,<br>A23f 1/08 |
| [50] | Field of Search | 99/71 |

[56] References Cited
UNITED STATES PATENTS

| 3,531,296 | 9/1970 | Smithies | 99/77 |
|---|---|---|---|
| 2,852,388 | 9/1958 | Cortez | 99/71 X |
| 2,929,716 | 3/1960 | Barch et al. | 99/71 |
| 2,976,158 | 3/1961 | Morgan, Jr. et al. | 99/71 X |
| 3,100,151 | 8/1963 | Breivik et al. | 99/71 |

FOREIGN PATENTS

| 1,127,370 | 9/1968 | Great Britain | |

Primary Examiner—Frank W. Lutter
Assistant Examiner—William L. Mentlik
Attorneys—Richard C. Witte and Edmund J. Sease ABSTRACT: Disclosed is a method of eliminating the problem of foam and scum on cups of instant coffee beverage by removal of polyvalent metal cations from the natural components of instant coffee as well as from the water used during extraction by contacting liquid coffee extract with a cationic exchange resin.

NONFOAMING AND NONSCUMMING INSTANT COFFEE

BACKGROUND TO THE INVENTION

Instant coffee can be prepared in a number of ways. Most commonly it is manufactured by spray drying an aqueous coffee extract to produce a dry solid product in the form of tiny hollow granules.

Instant coffee has gained substantial commercial acceptance in recent years, but still possesses a number of problems which require solution before totally acceptable product will become available to the consumer.

One such problem which has been receiving some attention in recent years is the appearance of coffee foam and unsightly froth which forms on the surface of the coffee liquid when hot water is added to instant coffee granules. One theory is that the foam is caused by air which is present within and between the instant coffee granules. It is theorized that the air forms a foam when entrapped by the addition of water and the foam is apparently stabilized by some natural constituent of the coffee. Generally speaking, the foam will vary in amount from a layer which dominates the entire liquid surface to a thin ring or arc which attaches to the cup surface at the top of the coffee liquid. Additionally, the foaming problem is accentuated in many households by the failure of the consumer to use boiling water in preparing the coffee. When cooler water is used, the foam problem increases.

Coffee foam is generally accompanied by a "scum" of insoluble materials which are either natural constituents of the coffee or which are produced during the production of the instant coffee.

Either alone or in combination, the foam and scum present an unappetizing appearance which is undesirable for liquid coffee.

Several attempts have been made to find additives capable of eliminating the foam and scum problems. Such an additive for use in instant coffee must be capable of preventing a formation of foam and scum during instant coffee reconstitution or else capable of eliminating them shortly after reconstitution. Further, the additive must not produce objectionable appearance, odor, or flavor changes in either the dry product or the reconstituted coffee liquid.

Several recent attempts to solve the foaming problem are shown in Barch et al. U.S. Pat. No. 2,929,716 issued Mar. 22, 1960, and Breivik et al. U.S. Pat. No. 3,100,151 issued Aug. 6, 1963, and Kellogg U.S. Pat. No. 2,564,332. The Barch patent suggests the use of $C_{12}$ to $C_{20}$ fatty acids or their salts as instant coffee defoamers; the Breivik patent teaches the use of monoglycerides of fatty acids for the same purpose; and the Kellogg patent discloses the addition of an emulsifying agent, preferably lecithin, as a means of reducing the amount of fatty materials floating on the top of a liquid beverage. Bergeron et al. U.S. Pat. application Ser. No. 517,927, a copending and commonly assigned application, filed Jan. 3, 1966, now U.S. Pat. No. 3,436,227 relates to the use of hydrocarbon substituted polycarboxylic acid as defoaming agents. Another copending and commonly assigned application Strobel, "An Instant Coffee Product," Ser. No. 778,758, filed Nov. 25, 1968 relates to chelating agent additives as a means of reducing foaming and scumming tendencies. While the defoaming and descumming additive method of eliminating foam and scum is a satisfactory method of reducing coffee cup foam and scum, it can create problems, i.e. the additive may be classified as an adulterant, or it may have adverse flavor effects; consequently some attention has been given to attempting to find a method of eliminating cup scum and foam of essence containing beverages without the use of additives. Cortez U.S. Pat. No. 2,852,388 issued Sept. 16, 1958 discloses extracting and changing the polarity characteristics of tea constituents by subjecting the tea to an ion exchange in a water solution at a high temperature. British Pat. No. 1,127,370 shows preparation of a nonscum tea product by preparing decationized tea extract through an $H^+$ ion form resin exchange column and thereafter combining decationized tea extract with soluble tea solids and a calcium compound which does not contain a salt-forming anion. While both the Cortez patent and the British patent show an ion exchange treatment, neither treatment is suitable for preparing nonfoaming and nonscumming soluble coffee products. Both patents are directed specifically toward the treatment of tea, and the British patent teaches addition of $Ca^{++}$ ions which applicants have found accentuates foaming and scumming tendencies of soluble coffee.

In summary, the prior art discloses many methods of reducing foaming and scumming tendencies of instant coffee by the use of additives; however heretofore a method of reducing soluble coffee foaming and scumming tendencies without employing additives has not been known. Applicants have found surprisingly that by approaching the problem of instant coffee foaming and scumming in a manner unknown in the prior coffee-related art as detailed below, both foaming and scumming tendencies can be substantially eliminated.

Accordingly, it is an object of this invention to provide an instant coffee substantially free of any tendency to form cup scum and foam without utilizing additives.

Another object of this invention is to provide an instant coffee product characterized by forming a cup of instant coffee that is of unusual clarity and of acceptable flavor.

Still another object of this invention is to provide an instant coffee product substantially free of disassociated polyvalent metal cations.

Yet another object of this invention is to provide a method of preparing an instant coffee product characterized by substantial elimination of free polyvalent metal cations both from the coffee itself and also the water used for extraction as well as reconstitution.

These and other objects of the invention are accomplished by contacting instant coffee extract with a cationic exchange resin resulting in removal of polyvalent metal cations which in turn substantially decreases the foaming and scumming tendencies of the instant coffee product.

The following definitions are hereinafter used in the specification examples and claims: The phrase "soluble coffee product" refers to a dry instant coffee product which may include products made from cation exchange treated coffee extract and/or instant coffee products made from untreated coffee extract; the phrase "untreated coffee extract" refers to a liquid extract of coffee prepared from roast and ground coffee which has not been treated by the process of this invention; the phrase "cation exchange treated coffee extract" refers to a coffee extract treated by the process of this invention; the phrase, "cation exchange treated soluble coffee" refers to a dried cation exchange treated coffee extract; and the phrase "untreated dry soluble coffee" refers to instant coffee prepared from untreated coffee extract.

SUMMARY OF THE INVENTION

This invention relates to an improved instant coffee product and a method of producing it. More specifically it relates to a soluble coffee product which produces little or no coffee foam or scum when reconstituted with hot water. The objects of this invention are achieved by providing a soluble coffee product characterized by being substantially free from disassociated polyvalent metal cations. Polyvalent metal cations are removed by use of a cationic exchange resin. Untreated coffee extract is contacted with a cationic exchange resin to remove excess free polyvalent metal cations from said extract. Most specifically the invention comprises a method of reducing soluble coffee foaming and scumming tendencies comprising contacting coffee extract with a cationic exchange resin.

DETAILED DESCRIPTION OF THE INVENTION

The soluble coffee products in whose production the present invention can be applied are dry, granular, water soluble coffee extracts. The granules generally range in size from about 30 microns to about 400 microns. The most common, and the type with the most serious foam problem, is spray dried coffee soluble product. Soluble coffee products of this type are ordinarily prepared by a process comprising extracting roast and ground coffee under pressure with hot water to provide a coffee extract and they spray drying this extract. In a typical extraction operation, roast and ground coffee can be placed in a conventional countercurrent extraction system and extracted at about 0 to 300 p.s.i.g. with about 150° F. to 375° F. water at a water to coffee weight ration of about 1:1 to 3:1 to produce a coffee extract with a solids content of about 20 percent to about 35 percent based on the weight of the liquid extract. Then, typically, extract so obtained is filtered, cooled, and they spray dried, for example, at 150° F. to 600° F. air and at a pressure of about 50 to 4,000–10,000 p.s.i.g. The spray dried granules formed are then screened to obtain the desirable size distribution, flavor and aroma boosters are added if desired, and thereafter the resulting soluble coffee product is packaged for shipment and sale. The hollow granules formed by the spray drying process are conducive to air entrapment; consequently foam production is a particularly serious problem with spray dried soluble coffee product. Moreover, similar problems do exist with soluble coffee product prepared by other drying methods, such as by foam, freeze, or vacuum drying; thus the process of this invention can also be beneficially applied in the production of these soluble coffee products.

It has been found that excessive amounts of unassociated polyvalent metal cations, for example, $Fe^{+++}$, $Ca^{++}$, and $Mg^{++}$ are present in natural components of coffees and the water used in preparing soluble coffee products, e.g. in the extraction operation. These unassociated polyvalent metal cations combine with soluble coffee product ingredients like proteins, carbohydrates, and anionic lipids, to form insoluble nondispersible scum and foam on the surface of reconstituted soluble coffee product.

Contacting untreated coffee extract with a cationic exchange resin, i.e. utilizing the process of the present invention, removes free polyvalent metal cations and thereby eliminates the forming of insoluble nondispersible foam and scum. Additionally, it is believed that the process of this invention removes polyvalent metal cations from natural chelating agents present in coffee which, after polyvalent cation removal, serve as scavengers for binding of additional unassociated cations if any are still present.

Untreated coffee extract according to the process of this invention is contacted with a cationic exchange resin. The term "cation exchange resin" refers to a resin exchange column capable of removing positive polyvalent metal ions and replacing them by hydrogen ions or monovalent metal ions. The exchange resin prior to contact with untreated coffee extract must be in either protonated form, as for example, in hydrogen ion form or monovalent metal ion form, as for example, sodium ion form. Such exchange resins are well known in the ion exchange art.

Typical examples of cation exchange resins useful herein are sulfonated polystyrene, carboxylated polystyrene, phosphorylated polystyrene, and iminodiacetated polystyrene. Suitable cation exchange resins are readily available on the market. For example, suitable sulfonated polystyrene cationic resin exchange columns are sold under the trade names of Amberlite IR 120 and Dowex 50–X–8. Carboxylated polystyrene is sold under the trade name of Amberlite IRC–50 and imminodiacetated polystyrene is sold under the trade name of Dowex A–1. The preferred resins for use herein are sulfonated polystyrenes.

As mentioned previously, in order for the exchange resin to effectively remove polyvalent metal cations from untreated coffee extract, it is essential that the resin be a cationic exchange resin or in other words the resin must be in protonated or monovalent metal ion form. After use for a period of time such that all of the equivalents of hydrogen ions or monovalent metal ions have been exchanged, the resin loses its activity unless it is reconverted to its protonated or monovalent metal ion form, as for example, by washing the resin with an acid such as hydrocholoric acid. Determining the frequency of resin washes with HCl is a matter of simple stoichiometry and easily calculable for one skilled in the art.

It is preferred that only a portion of the untreated coffee extract utilized in preparing the final soluble coffee product be treated by contacting it with a cationic exchange resin. It has been found that if all of the soluble coffee product is prepared from cation exchange treated coffee extract, the soluble coffee product is characterized by a peculiarly flat taste which is acceptable to the consumer but not highly preferred. In preparing a readily commercially acceptable nonscumming and nonfoaming soluble coffee product having enhanced flavor characteristics, it is highly preferred that a weight ratio on a dry basis of cation exchange treated coffee extract to untreated coffee extract or the weight ratio of cation exchange treated soluble coffee to untreated dry soluble coffee utilized in preparing a soluble coffee product be from about 1:4 to about 1:1.5. It is preferred this ratio be at least about 1:4 in order that the nonscumming and nonfoaming property of the cation exchange treated extract be carried through to the final product. On the other hand, if ratios in excess of about 1:1.5 are employed, while the soluble coffee product does not scum or foam, the acceptable but not preferred flat taste of the cation exchange treated coffee extract becomes readily apparent. A most preferred dry weight basis combining ratio which optimizes the nonscumming and nonfoaming properties and emphasizes desirable flavor notes is from about 1:3 to about 1:2.

The cation exchange treated coffee extract can be conveniently prepared by slight modifications in presently known soluble coffee processes such as batch extraction processes and semicontinuous countercurrent extraction processes. In regard to batch extraction processes, coffee extract can be treated by contacting extract liquid with a cation resin exchange column as the extract emerges from its vessel. Subsequently, conventional concentration and drying procedures such as those described in Sivetz, Coffee Process Technology, volume 1, pages 19–20 and 48–50 and in chapters 11 and 12, which are incorporated herein by reference, can be utilized.

In regard to countercurrent extraction processes, which are characterized by passing extract liquor through a plurality of connected extraction columns (an extraction train) wherein extract liquor passes through one column to another and is successively contacted by progressively fresher coffee grounds and finally drawn off from the column containing the freshest coffee, extract drawn off from the last column can be run through a cation resin exchange column which has been connected to the extraction train below an extract drawoff line. The cation exchange treated coffee extract can be processed in a conventional manner by concentrating for example by thin film evaporation or freeze concentration and subsequently drying, for example, by thin film evaporation, foam drying, freeze drying or spray drying.

While the foregoing and subsequent description is in terms of employment of a resin exchange column, other means of contacting the cation exchange resin and untreated coffee extract can be employed such as intimate admixing in a large vessel; however, the preferred and simplest method from a processing point of view is to accomplish the contacting by passing untreated extract through a packed column of cation exchange resin.

No criticality exists with respect to contact time between untreated coffee extract and a cationic resin exchange column. The ion exchange is substantially instantaneous upon contact. The rate of extract throughout with respect to the cationic resin exchange column depends largely upon the size dimensions of the resin column. However, for a column 3 feet 6 inches high and having an inside diameter of 3 inches a preferred throughput rate is from 500 to 1,500 milliliters/min. Extract can be gravity fed through the resin column or alternatively it can be pushed through by using a nitrogen pressure line driving force of from 5 to 15 lbs./sq. inch.

In the preparation of the final preferred soluble coffee product of this invention cation exchange treated coffee extract or cation exchange treated soluble coffee is admixed either with untreated liquid coffee extract or with untreated dry soluble coffee followed by drying if the admixing operation results in a liquid. From a processing standpoint, it is preferred that admixing in the prescribed weight ratios be accomplished by admixing cation exchange treated liquid coffee extract with untreated liquid coffee extract followed by concentrating and drying. Mixing cation exchange treated and untreated coffee extract liquids is preferred because (1) it allows for intimate mixing and (2) less process steps are involved. However, very satisfactory results can be obtained, for example, by dry mixing, in the appropriate ratios, cation exchange treated and dried soluble coffee with untreated and dried soluble coffee. In the preferred method of mixing the liquid extracts cation exchange treated extract and untreated extract (in the prescribed weight ratios) are piped into a suitable vessel wherein intimate mixing is accomplished. After mixing, the combined extracts are concentrated and dried, for example, by conventional processes.

A less practical but possible method of preparing a mixture of cation exchange treated and untreated soluble coffee comprises reconstituting untreated dry soluble coffee, contacting it with a cation resin exchange column, optionally concentrating the liquid, subsequently drying the reconstituted liquid or liquid concentrate, and thereafter admixing, in the appropriate weight ratio, with untreated dry soluble coffee.

The following examples are given to demonstrate the effectiveness of instant coffee prepared according to the process of this invention in regard to its nonfoaming and nonscumming properties. The examples are not intended to be limitations upon the invention but merely illustrative of specific embodiments.

In evaluating coffee processed according to this invention an arbitrary foam and scum scale ranging from 0–5 was chosen for measuring the coffee cup appearance. A high scumming and foaming decaffeinated product was given a foaming and scumming grade of 5 and was used as a standard for comparison. Thus a cup of coffee beverage having excessive foaming tendencies was labeled 5 and a cup of coffee having no foam and/or scumming tendencies would be labeled 0. The higher the grade number given the more undesirable the foaming and scumming tendency. Conversely, the closer the grade number approaches 0 the lower the scumming or foaming tendency. A typical commercially available spray dried soluble coffee product has a foam grade of 3. This grade is indicative of the foam grade of untreated dry soluble coffee powder produced in the following examples.

The following examples further illustrate the present invention.

EXAMPLE I

A six column pilot plant countercurrent extraction train is set up. Each column of the extraction train is 4 ft. long and has a 6 inch inside diameter. The columns are connected to one another by a liquid inlet line and a liquid outlet line. Each column is loaded with 20.2 lbs. of blended roast and ground coffee beans. The blend consists by weight of 15 percent African Robusta, 50 percent Central American Arabica and 35 percent Brazilian and Ethiopian Arabica. The six column extraction train is run using conventional extraction conditions. Beginning with the column containing the most nearly exhausted coffee grounds and thereafter progressing sequentially to the column containing the freshest coffee grounds, the inlet temperature to each column is as follows: 360° F., 350° F., 325° F., 310° F., 280° F., 230° F. The pressure employed during the extraction is 150 p.s.i.g. The extraction cycle time (i.e. the time interval after startup and before each drawoff) is 20.0 minutes.

Ten lbs. of untreated coffee extract is drawn off at the liquid outlet line of the column containing the freshest coffee grounds and is contacted in a resin exchange column with a cationic resin which is a sulfonated polystyrene (protonated form) resin sold under the trade name Amberlite IR 120. The column is 3 feet 6 inches high and has a diameter of 3 inches. The column is packed with 4,500 grams of Amberlite IR 120. The throughput rate is 600 ml./min. The extract was gravity fed through the column. Five lbs. of cation exchange treated coffee extract is admixed with 20 lbs. of untreated coffee extract previously prepared as described above except it was not contacted with a cationic resin exchange column. The weight ratio on a dry basis of cation exchange resin treated coffee extract to untreated coffee extract is 1:4. Mixing is accomplished by placing the treated and untreated coffee extracts in a large stainless steel vessel wherein it is stirred for 3 minutes. The mixture of cation exchange treated and untreated coffee extract is concentrated by thin film vacuum evaporation until the coffee solubles content is about 50 percent. The admixture of cation exchange treated and untreated concentrate is then spray dried to a moisture content of about 3.5 percent in a conventional 6 foot by 15 foot spray dryer using an air inlet temperature of 470° F., an air outlet temperature of 200° F. and a nozzle pressure of 500 p.s.i.g.

Three grams of the soluble coffee prepared as described above is dissolved in 200 milliliters of distilled water at 90° C. The water solution is stirred and after observation of the surface of the coffee beverage a foam and scum grade of 0, indicating no foam or scum is present, is assigned.

The coffee is then tasted by a panel of four expert coffee tasters and is compared with cups of instant coffee prepared without using cation exchange treated extract. No significant difference in flavor qualities between cation exchange treated and untreated soluble coffee product is noted.

When in the above example, cation exchange treated extract is concentrated and dried as described but is not admixed with untreated extract, the foam and scum grade is 0 and the flavor panel in tasting the beverage produced therefrom noticed a slightly flat but acceptable taste.

When in the above example, the spray dried instant coffee of replaced by foam dried, freeze dried and vacuum dried instant coffee products, substantially similar nonscumming and nonfoaming and flavor results are obtained.

EXAMPLE II

Five pounds of untreated liquid coffee extract is prepared in a countercurrent extraction process as described in example I. The untreated coffee extract is contacted with a cationic resin exchange column which is a sulfonated polystyrene (protonated form) resin column sold under the trade name Dowex-50-X-8. The column had the same size dimension as the column shown in example I and the throughout rate is 600 ml./min. The extract is gravity fed through the column. After contacting the cationic resin exchange column, the treated coffee extract is concentrated by thin film vacuum evaporation until the coffee solubles content is about 50 percent. The cation exchange treated coffee extract concentrate is subsequently spray dried to a moisture content of about 3.5 percent in a conventional 6 ft. by 15 ft. spray dryer using an inlet air temperature of 470° F., an air outlet temperature of 200° F. and a nozzle pressure of 500 p.s.i.g.

Fifteen lbs. of untreated coffee extract is prepared as described in example I. The untreated coffee extract is concentrated by thin film vacuum evaporation until the coffee solubles content is about 50 percent and thereafter spray dried to a moisture content of about 3.5 percent in a conventional spray dryer as described above.

One lb. of cation exchange treated soluble coffee powder prepared as described above is thereafter admixed in a conventional mixing vessel with 2.5 lbs. of untreated soluble coffee powder prepared as described above. The weight ratio of cation exchange treated soluble coffee to untreated dry soluble coffee is 1:2.5. After intimate mixing in a rotary drum mixer 3 grams of the mixture of cation exchange treated and untreated soluble coffee powders is dissolved in 200 milliliters of distilled water at 90° C. The water solution is stirred and after observation of the surface of the coffee beverage a foam and scum grade of 0 is given indicating no foam or scum is present.

The coffee beverage is then tasted by a panel of four expert tasters and compared with cups of conventionally prepared instant coffee. No significant difference in flavor qualities between the cation exchange treated and untreated soluble coffee products is noted.

When in the above example, cation exchange treated extract is concentrated and dried as described but is not combined with untreated powder, the foam and scum grade is 0 and the flavor panel in tasting the beverage produced therefrom noticed a slightly flat but acceptable taste.

When in the above example spray dry soluble coffee is replaced by foam dried, freeze dried and vacuum dried instant coffee substantially similar nonfoaming and nonscumming and flavor results are obtained.

Example III

One hundred grams of conventionally prepared soluble coffee product sold under the trade name of Folger was dissolved in 800 milliliters of distilled water and the solution was contacted with a cationic resin exchange column (protonated form) sold under the trade name of Amberlite IR 120. The column was a 5×60 cm. glass column packed with 453 grams of Amberlite IR 120 which is a sulfonated polystyrene resin. The throughput flow rate was 30 ml./min. The extract was gravity fed through the column. After contacting the cationic resin exchange column, the solution of soluble coffee was collected and freeze dried to yield 85 grams of treated soluble coffee powder. Two grams of the cation exchange treated soluble coffee powder was admixed with 3 grams of untreated soluble coffee powder sold under the trade name of Folger. The weight ratio of cation exchange treated soluble coffee to untreated dry soluble coffee was 1:1.5. A 3 gram portion of the mixture was dissolved in 200 milliliters of distilled water at 90° C. The coffee beverage was stirred and after observation of the surface of the coffee a foam and scum grade of 0 was given indicating no foam or scum was present. The coffee was then tasted by a panel of four expert coffee tasters and compared with cups of beverage prepared from the conventionally processed Folgers soluble coffee product. No significant difference in flavor qualities between the treated and untreated soluble coffee products was noted.

When in the above examples carboxylic polystyrene, phosphorylated polystyrene and iminodiacetated polystyrene are substituted for sulfonated polystyrene substantially similar nonscumming and nonfoaming and flavor results are obtained.

What is claimed is:

1. A method of forming a nonscumming and nonfoaming soluble coffee product which, when mixed with water to form coffee beverage at normal usage levels, is substantially free of disassociated polyvalent metal cations, and which consists essentially of:
   a. contacting untreated coffee extract with a cationic ion exchange resin to form a cation exchange treated coffee extract; and thereafter
   b. concentrating and drying said cation exchange treated coffee extract to form a nonscumming and nonfoaming soluble coffee product.

2. The method of claim 1 wherein the cation exchange resin is a sulfonated polystyrene resin.

3. The method of claim 2 wherein, prior to said concentrating and drying step, said cation exchange treated coffee extract is admixed with untreated coffee extract on a dry weight basis ratio of cation exchange treated coffee extract to untreated coffee extract of from about 1:4 to about 1:1.5.

4. The method of claim 3 wherein said cation exchange treated coffee extract and said untreated coffee extract are admixed on a dry weight basis ratio of from 1:3 to 1:2.

5. The process of claim 2 wherein an additional step comprises admixing said nonscumming and nonfoaming soluble coffee product with untreated dry soluble coffee on a dry weight basis ratio of from about 1:4 to about 1:1.5 to form a flavor enhanced nonscumming and nonfoaming soluble coffee product.

6. The process of claim 5 wherein the dry weight basis ratio is from about 1:3 to about 1:2.

7. The method of claim 6 wherein said untreated coffee extract to be contacted with a cationic exchange resin is prepared by dissolving untreated dry soluble coffee in water.

8. The method of claim 5 wherein said untreated coffee extract to be contacted with a cationic exchange resin is prepared by dissolving untreated dry soluble coffee in water.

9. A method of forming a nonscumming and nonfoaming soluble soluble coffee product which, when mixed with water to form coffee beverage at normal usage levels, is substantially free of disassociated polyvalent metal cations, and which consists essentially of:
   a. contacting untreated coffee extract with a sulfonated polystyrene cationic ion exchange resin to form a cation exchange treated coffee extract;
   b. admixing said cation exchange treated coffee extract with untreated coffee extract on a dry weight basis ratio of cation exchange treated coffee extract to untreated coffee extract of from 1:3 to about 1:2, and thereafter
   c. concentrating and drying the admixture of step (b) to form a flavor enhanced nonscumming and nonfoaming soluble coffee product.

10. The product of process of claim 9.

* * * * *